July 19, 1949.  J. T. G. OVERBEEK ET AL  2,476,681
FLUORESCENT MATERIAL AND ELECTRIC DISCHARGE DEVICE
Filed Dec. 5, 1946
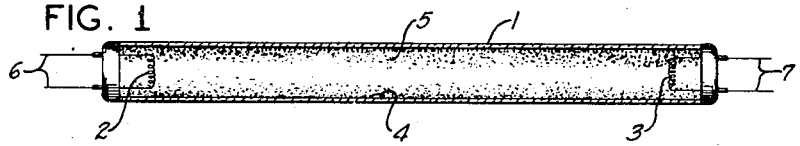
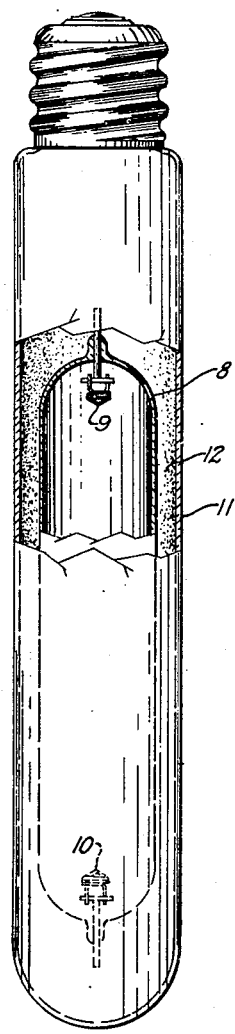
INVENTORS:
JAN THEODOOR GERARD OVERBEEK,
FERDINAND ANNE KROGER,
BY John H Anderson
THEIR ATTORNEY Patented July 19, 1949

2,476,681

UNITED STATES PATENT OFFICE 2,476,681

FLUORESCENT MATERIAL AND ELECTRIC DISCHARGE DEVICE

Jan Theodoor Gerard Overbeek and Ferdinand Anne Kröger, Eindhoven, Netherlands, assignors to General Electric Company, a corporation of New York Application December 5, 1946, Serial No. 714,262
In the Netherlands July 22, 1942

Section 1, Public Law 690, August 8, 1946
Patent expires July 22, 1962

1 Claim. (Cl. 176—122)

This invention relates to electric discharge devices utilizing luminescent materials or phosphors, and further relates to new and improved phosphors for use in such devices.

Cerium as an activator in luminescent materials has been used heretofore. In addition it has been appreciated that the cerium content should be in trivalent condition in order to produce satisfactory fluorescence or luminescence. One of the prior art methods for producing such a cerium activated phosphor comprises precipitation from a solution of ethyl-silicate and cerium chloride by means of aqueous ammonia. The precipitate obtained is dried and heated at a high temperature in a reducing atmosphere. The substance thus obtained luminesces at a blue color on being subjected to radiation by the 2537 Angstrom unit line of the mercury spectrum. One disadvantage of such prior art cerium activated phosphors is the incident reduction in luminous output in obtaining the desired color of radiation.

Other previously known phosphors, for example, zinc sulphide activated by silver, sometimes evidence a high luminous output at ordinary temperatures but upon an increase in temperature the output decreases so considerably that they are not serviceable for many purposes. This temperature relation is highly important because the phosphors often must be arranged at a position relative to the primary source of radiation that they are subjected to relatively high temperatures.

In accordance with this invention, we provide cerium activated phosphors which obviate many of the disadvantages of the prior art phosphors, and which offer advantages in high luminous output, maintenance of high luminous output while satisfying color desiderata, maintenance of high luminous output under relatively high temperature conditions. Thus, for example, it has been found that the luminous output of a luminescent substance according to the invention built up from calcium oxide, silica and cerium oxide in the trivalent form is lowered by only 18 per cent between 20° C. and 200° C. Compared with blue luminous zinc sulphide the improvement is very substantial since the luminous output of zinc sulphide at 150° C. is 15 per cent of the luminous output at ordinary temperatures.

It is an object of our invention to provide new and improved luminescent materials or phosphors.

It is another object of our invention to provide new and improved electric discharge devices employing ionizable mediums such as mercury, and which employ new and improved trivalent cerium activated phosphors.

It is a further object of our invention to provide new and improved phosphors for use in electric discharge devices employing as ionizable mediums, the inert gases, or a vapor of zinc, cadmium, arsenic or mixtures thereof.

It is a still further object of our invention to provide new and improved methods of manufacturing phosphors of the type employing trivalent cerium as the activating agent.

Generally speaking, our invention relates to sources of radiation comprising electric discharge devices employing luminous vitreous or crystalline substances built up from oxides of silicon and trivalent cerium, jointly with one or more of the oxides of beryllium, magnesium, calcium, zinc, strontium, cadmium or barium, and in some cases alumina. More particularly, oxides of the metals in the second group of the periodic table are used as additions to silica, cerium oxide and alumina.

In such substances, the total quantity of cerium oxide, expressed in gram mols, is always less than the sum of the quantity of silica and alumina; its minimum value is 0.01 molecular percentage of this sum. The substances preferably contain from 1 to 5 molecular percentage, since we have found that this range of values produces the maximum luminous output, and we have found further that an increase in the quantity of cerium oxide is prejudicial so far as the total luminous output of the luminescent substance is concerned.

Furthermore, these substances are excitable by ultra-violet radiation both in the short wave and long wave regions. For example, if a mercury vapor discharge tube is used, these luminescent materials are excited by both the 2537 Angstrom unit and 3650 Angstrom unit lines of the mercury spectrum.

Substances of the above-described character produce luminescent radiation in the long wave ultra-violet and the adjoining part of the visible spectrum; the limits of this region are at about 3000 Angstrom units and 6000 Angstrom units. We have found that in most of the phosphors which we provide, the maximum of the emitted radiation lies at about 4200 Angstrom units.

For a better understanding of our invention reference may be had to the following description taken in connection with the accompanying drawing, and its scope will be pointed out in the appended claims. Fig. 1 diagrammatically illustrates an embodiment of our invention as applied to a low pressure positive column fluorescent lamp, and Fig. 2 is a further modification thereof as applied to a high pressure discharge device.

Before specifically discussing the manner in which these phosphors may be used, the method of manufacture will be considered. Following our invention, a mixture of the oxides of cerium, silicon and one or more of the elements beryllium, magnesium, calcium, zinc, strontium, cadmium or barium, in some cases jointly with alumina or substances from which these oxides are produced by heat, is heated in a nonoxidizing atmosphere, preferably in a reducing atmosphere. For the preparation of crystalline products the heating operation is preferably carried out up to closely below the melting point of the substance, whereas for the preparation of a vitreous substance the heating operation is carried out at temperatures ranging up to and above the melting point.

For a clear understanding of the method according to the invention and the results that can be achieved by means of the substances obtained the following five examples are given below.

Example I

A mixture is prepared from:

| | Grams |
|---|---|
| Precipitated calcium carbonate | 90 |
| Precipitated silica | 36.6 |
| Cero carbonate | 5 |

The mixture is heated for one and a half hour in a reducing atmosphere at a temperature of 1400° C. On being subjected to radiation by ultra-violet radiation of a mercury vapor discharge the substance obtained yields an intense blue emission (wavelength from 3600 Angstroms to 6000 Angstroms with a maximum at 4250 Angstroms).

The composition of the substance obtained may be represented by $3.00\ CaO:2.00\ SiO_2:0.03\ Ce_2O_3$.

The temperature relation becomes evident from the following table.

| Temperature in degrees C. | Luminous output in per cent |
|---|---|
| 0 | 100 |
| 100 | 93 |
| 200 | 82 |
| 300 | 60 |
| 400 | 40 |

Example II

A mixture is prepared from:

| | Grams |
|---|---|
| Calcium carbonate | 67 |
| Alumina | 34 |
| Silica | 20 |
| Cero carbonate | 5.5 |

The mixture is heated for about 1½ hours in a reducing atmosphere at 1470° C. On being subjected to radiation by ultra-violet rays of a mercury vapor discharge the substance obtained yields an intense blue emission (wavelength from 3600 to 6000 Angstroms with a maximum at 4200 Angstroms). After the radiation has ceased the substance phosphoresces for minutes on end.

The composition of the substance obtained may be represented by $2\ CaO:1\ SiO_2:1\ Al_2O_3:0.03\ Ce_2O_3$.

The temperature relation becomes evident from the following table:

| Temperature in degrees C. | Luminous output in per cent |
|---|---|
| 20 | 100 |
| 100 | 72 |
| 200 | 41 |
| 300 | 20 |

Example III

A mixture is prepared from:

| | Grams |
|---|---|
| Beryllium carbonate (47% beryllium oxide) | 72 |
| Silica | 40 |
| Cero carbonate | 11 |

This mixture is heated for 1 hour in a reducing atmosphere at a temperature of 1500° C. On being subjected to radiation by ultra-violet rays of a mercury vapor discharge the substance obtained yields a white-blue emission (wavelength from 3500 Angstroms to 6000 Angstroms with a maximum at 4300 Angstroms).

The composition of the substance obtained may be represented by $2\ Be_2O:1\ SiO:0.03\ Ce_2O_3$.

Example IV

A mixture is prepared from:

| | Grams |
|---|---|
| Strontium carbonate | 49 |
| Alumina | 34 |
| Silica | 40 |
| Cero carbonate | 9 |

The mixture is heated for 2½ hours in a reducing atmosphere at 1360° C. On being subjected to radiation by ultra-violet rays of a mercury vapor discharge the substance obtained yields a white-blue emission of from 3500 Angstroms to 6000 Angstroms with a maximum at 4300 Angstroms.

The composition of the substance obtained is $1\ SrO:1\ Al_2O_3:2\ SiO_2:0.05\ Ce_2O_3$.

Example V

A mixture is prepared from:

| | Grams |
|---|---|
| Calcium carbonate | 30 |
| Silica | 18 |
| Alumina | 20 |
| Cero carbonate | 3.3 |

The mixture is fused in a reducing atmosphere at 1500° C. On cooling a clear glass appears which on being subjected to radiation by ultra-violet rays of a mercury vapor discharge luminesces intensely in bright blue (wavelength from 3500 to 6000 Angstroms).

The luminescent substances may be applied in the form of a layer to the interior surface of the enclosing envelope of a discharge device. However, these phosphors may be applied to the outer envelope of a double-envelope device, in which the inner envelope is permeable to ultra-violet radiation and constituted of quartz or other ultra-violet pervious vitreous composition. Furthermore, these phosphors may be applied to reflectors positioned externally to the devices, and filters may be used to suppress undesired short wave length radiation.

As a substance to be used in a source of radiation according to the invention can be excited by rays of very different wavelengths use may either be made of a low-pressure mercury vapor discharge tube or of a super-pressure mercury vapor discharge tube, the latter term being understood to mean a tube in which the vapor pressure is so high when the tube is in use that the discharge is contracted to a small diameter. In certain cases use may also be made of discharge tubes having a filling constituted by rare gases or by vapor of zinc, cadmium, arsenic or by mixtures thereof.

Fig. 1 illustrates one embodiment of our invention as applied to a low pressure positive column fluorescent lamp, including an enclosing vitreous envelope 1 and including a pair of electrodes 2 and 3 which may be of the filamentary type. These electrodes may be of the activated type such as that employing an activating material. We may employ as an ionizable medium any one of those gases or vapors described above. In this instance mercury at relatively low pressure is used in conjunction with a low pressure atmosphere of a starting gas such as argon at a pressure ranging from 2 to 5 mm. of mercury. A supply of mercury which may exceed the amount which will vaporize during operation of the lamp is indicated by a drop 4 inside the envelope. An internal coating 5 of any one of the substances described above, and particularly an aluminum silicate of the above described group of metals is indicated by the numeral 5. A pair of heating circuits 6 and 7 are connected to the electrodes 2 and 3 respectively and the conventional type of energizing and starting circuits may be connected to these heating circuits.

Fig. 2 illustrates another embodiment of our invention as applied to a high pressure electric discharge device or fluorescent lamp including inner and outer envelopes. The inner envelope 8 encloses a pair of electrodes 9 and 10 which may be of the activated type. In this instance the ionizable medium may be mercury vapor operating at high pressure, that is operating within the pressure region which causes a constriction of the arc. On the other hand we may employ as the ionizable medium zinc, cadmium, arsenic or mixtures thereof operating at high pressures.

The inner envelope 8 is constructed of a material permeable to both short wave and long wave ultra-violet radiation produced by the arc discharge, and may comprise quartz or a vitreous material pervious to ultra-violet radiation.

The outer envelope 11 is preferably constructed of a vitreous material pervious to visible radiations, or may employ a material pervious to both visible radiation and a predetermined portion of the ultra-violet part of the spectrum. One of the above described materials or phosphors is applied to the interior surface of the outer envelope 11 and is indicated by the reference numeral 12.

In view of the above description it will be apparent that inasmuch as the phosphors prepared in accordance with our invention are excited by long and short wave ultraviolet radiation, the phosphors are particularly effective in producing transformation or conversion of long wave and short wave ultra-violet radiation into visible radiation within the region ranging from 4300 Angstrom units to 6000 Angstrom units. These phosphors, in conjunction with the above described vapors to be used as ionizable mediums, particularly mercury vapor, afford distinct advantages by such correlation between the sensitivity of the phosphors to long wave and short wave ultra-violet radiation and the wide range of emitted radiation.

What we claim as new and desire to secure by Letters Patent of the United States is:

In combination, a high pressure electric discharge device comprising an inner envelope of material previous to ultraviolet radiations and enclosing a plurality of electrodes, an ionizable medium therein comprising an arsenic vapor for supporting an arc discharge, an outer envelope enclosing said inner envelope, and a fluorescent coating on said outer envelope responsive to the radiation produced by said discharge including a substance containing an aluminum silicate of a metal in the group consisting of beryllium, magnesium, calcium, zinc, strontium, cadmium and barium with a trivalent cerium oxide as an activator, said substance being excited by both short and long wave ultra-violet radiation and which is highly emissive in the range from 3600 to 6000 Angstrom units, and in which the cerium oxide is present in an amount ranging from 0.01 to 5 molecular per cent of the sum of alumina and silica.

JAN THEODOOR GERARD OVERBEEK.
FERDINAND ANNE KRÖGER.

REFERENCES CITED

The following references are of record in the file of this patent:

UNITED STATES PATENTS

| Number | Name | Date |
|---|---|---|
| 2,030,399 | Rompe | Feb. 11, 1936 |
| 2,152,989 | Ewest | Apr. 4, 1939 |
| 2,171,145 | Leverenz | Aug. 29, 1939 |
| 2,176,151 | Ruttenauer | Oct. 17, 1939 |
| 2,225,495 | Germer | Dec. 17, 1940 |

FOREIGN PATENTS

| Number | Country | Date |
|---|---|---|
| 172,499 | Switzerland | |
| 217,269 | Great Britain | June 10, 1924 |